United States Patent
Weng et al.

(10) Patent No.: US 6,607,252 B2
(45) Date of Patent: Aug. 19, 2003

(54) ANTI-VIBRATION BRAKE SYSTEM

(75) Inventors: Jiansheng Weng, Nanjing (CN); Thomas Michael Dalka, Sterling Heights, MI (US); Wei-Yi Loh, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,446

(22) Filed: Sep. 4, 2001

(65) Prior Publication Data

US 2003/0042791 A1 Mar. 6, 2003

(51) Int. Cl.[7] .............................................. B60T 17/08
(52) U.S. Cl. .................................. 303/87; 303/DIG. 10
(58) Field of Search ................................ 303/87, 119.3, 303/DIG. 10, DIG. 11, 84.1

(56) References Cited

U.S. PATENT DOCUMENTS

| | | | |
|---|---|---|---|
| 3,568,791 A | | 3/1971 | Luxton |
| 4,188,073 A | * | 2/1980 | Ishikawa et al. ............... 303/87 |
| 4,408,635 A | | 10/1983 | Packer |
| 5,035,469 A | * | 7/1991 | Geilen et al. ................... 303/87 |
| 5,070,983 A | | 12/1991 | Leigh-Monstevens et al. |
| 5,172,956 A | * | 12/1992 | Klose et al. ................... 303/87 |
| 5,618,085 A | * | 4/1997 | Siegel et al. ............. 303/113.1 |
| 5,921,636 A | * | 7/1999 | Roberts ......................... 303/87 |
| 6,123,525 A | * | 9/2000 | Burns ............................ 303/87 |
| 6,203,117 B1 | * | 3/2001 | Starr et al. ..................... 303/87 |

FOREIGN PATENT DOCUMENTS

EP          563555 A1      10/1993

* cited by examiner

Primary Examiner—Jack Lavinder
Assistant Examiner—Robert A. Siconolfi
(74) Attorney, Agent, or Firm—Gregory P. Brown

(57) ABSTRACT

A brake system for a vehicle having wheels. The brake system includes a brake housing and a flow chamber housing. The brake housing includes a friction element being adapted to move to engage a portion of the wheels for inhibiting rotation of the wheels. The flow chamber housing includes a substantially circular flow chamber and a brake fluid line. The substantially circular chamber housing includes an enlarged flow chamber has a circumferential wall and a peripheral wall and a pair of opposite walls. The enlarged flow chamber is fluidly interconnected to the brake housing for supplying fluid to the brake housing for moving the friction element. The brake fluid line is connected substantially tangentially to the circumferential wall of the flow chamber housing includes a first fluid line connected to the peripheral wall of the enlarged flow chamber and a master cylinder fluid line connected to one of the pair of substantially circular flow chamber whereby oppositely facing walls of the enlarged flow chamber. A pressure wave in the fluid entering the substantially circular enlarged flow chamber from the first fluid line will be forced to move in a substantially circular path reflect off of the peripheral wall at a plurality of points to thereby dissipate the pressure wave.

20 Claims, 4 Drawing Sheets

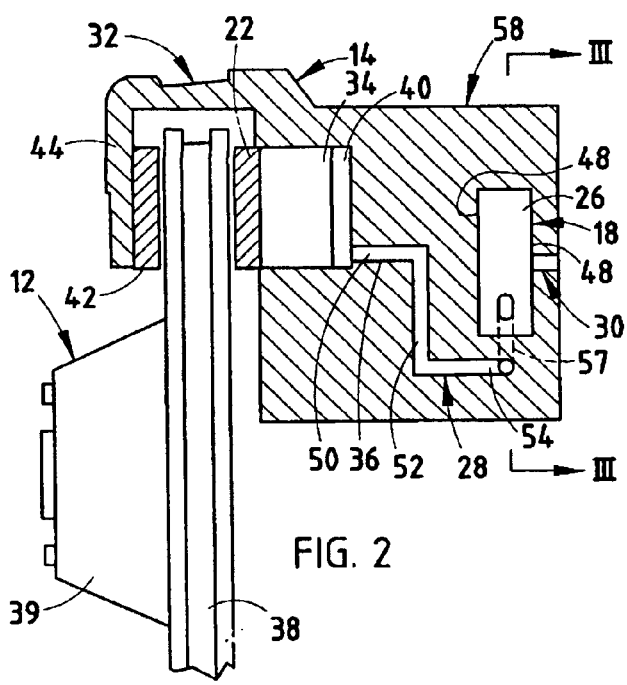
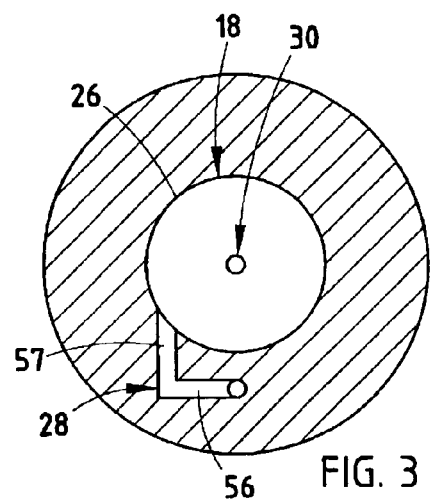
FIG. 2
FIG. 3
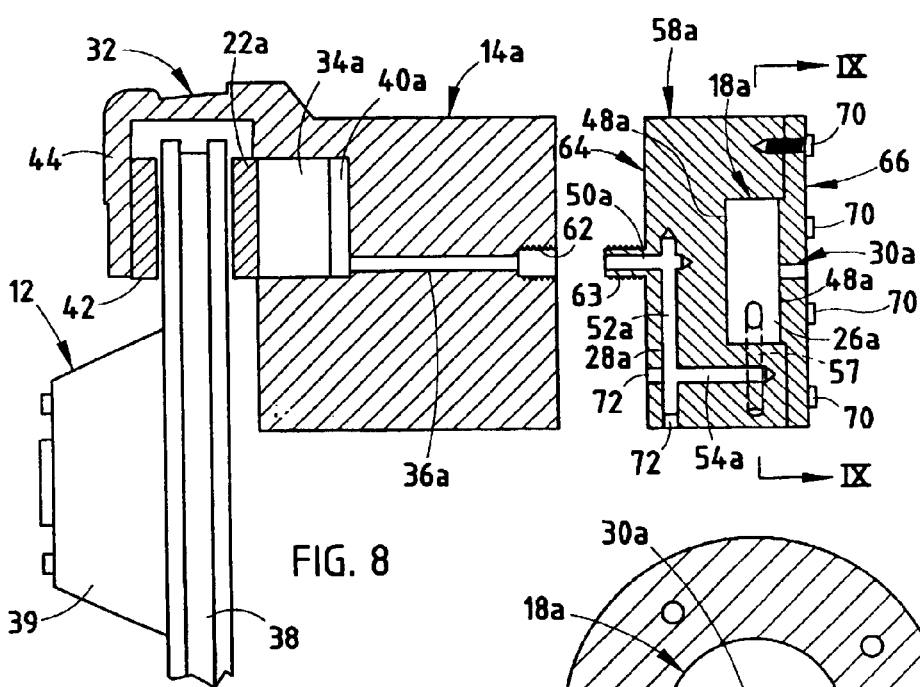
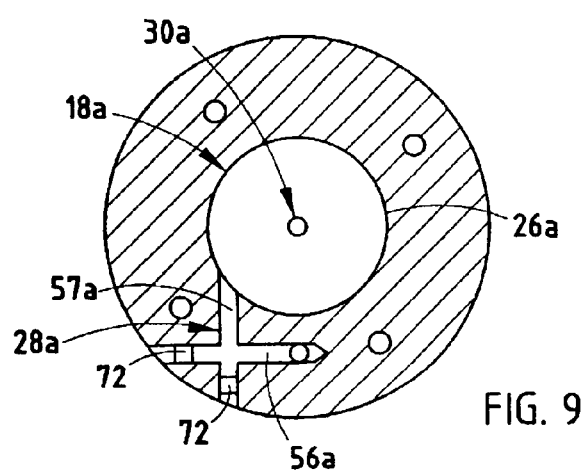
FIG. 8
FIG. 9

— PRIOR ART BRAKE SYSTEM WITH 30 MICRON DTV ROTOR
— BRAKE SYSTEM HAVING CIRCULAR FLOW CHAMBER WITH 30 MICRON DTV ROTOR

— PRIOR ART CALIPER WITH 30 MICRON ROTOR
— CALIPER WITH 30 MICRON ROTOR CONNECTED TO A CIRCULAR FLOW CHAMBER

ANTI-VIBRATION BRAKE SYSTEM

BACKGROUND OF INVENTION

The present invention relates to braking of a vehicle, and in particular to a brake system of a vehicle.

Vehicles currently have brake systems that are used to inhibit rotation of the wheels of the vehicle to decelerate and stop the vehicles. The brake systems of vehicles typically include a hydraulic brake system having disc brakes and/or drum brakes. The disc brakes include a brake pad that engages a rotor interconnected to the tire of the vehicle to decelerate the vehicle. The drum brakes include brake shoes that engage a drum interconnected to the tire of the vehicle to decelerate the vehicle.

Heretofore, vehicles having a hydraulic brake system have experienced brake torque variation due to disc thickness variation (DTV) in the rotor of disc brakes or insufficient cylindricity of the drum in drum brakes. The forces created by the brake torque variation are transmitted to the tire of the vehicle and cause the tires of the vehicle to vibrate in the longitudinal direction of the tire. This vibration is thereafter transmitted to the brake system and chassis of the vehicle and results in brake roughness. Brake roughness is defined as the unexpected vibration that the driver of the vehicle feels through the steering wheel, brake pedal and seat track. The vibration associated with brake roughness can be transmitted to the driver of the vehicle, causing the driver to feel the vibrations. FIG. 4 shows the brake torque of a vehicle using the prior art rotor with a DTV less than 6 microns as a function of time during a simulated stop on a brake dynamometer. As seen in FIG. 4, the prior art hydraulic brake system with a DTV less than 6 microns does not experience significant brake torque variation. However, as seen in FIG. 5, when the DTV of the prior art rotor is 30 microns, the brake torque variation can become significant.

Accordingly, a practical, economical braking system reducing brake torque variation and brake roughness is desired.

SUMMARY OF INVENTION

An aspect of the present invention is to provide a brake system for a vehicle having wheels. The brake system includes a brake housing and a flow chamber housing. The brake housing includes a friction element being adapted to move to engage a portion of the wheels to inhibit rotation of the wheels. The flow chamber housing includes an enlarged flow chamber having a peripheral wall and a pair of oppositely facing walls. The a substantially circular flow chamber and a brake fluid line. The substantially circular flow chamber has a circumferential wall andenlarged flow chamber is fluidly interconnected to the brake housing for supplying fluid to the brake housing for moving the friction element. The brake fluid line is connected substantially The flow chamber housing includes a first fluid line connected to the tangentially to the circumferential wall of the substantially circular flow chamber whereby aperipheral wall of the enlarged flow chamber and a master cylinder fluid line connected to one of the pair of oppositely facing walls of the enlarged flow chamber. A pressure wave in the fluid entering the substantially circularenlarged flow chamber from the firstfirst fluid line will be forced to move in a substantially circular pathreflect off of the peripheral wall at a plurality of points to thereby dissipate the pressure wave.

Another aspect of the present invention is to provide a vehicle having a wheel, a brake housing, a master cylinder and a flow chamber housing. The brake housing is located adjacent the wheel. The brake housing includes a friction element adapted to move to engage a portion of the wheel to inhibit rotation of the wheel. The master cylinder is adapted to provide a force to a brake fluid in the brake housing to move the friction element. The flow chamber housing is located in a fluid path between the brake housing and the master cylinder. The flow chamber housing includes a substantially circular flow chamber having a circumferential wall, a first fluid line fluidly connected to the brake housing and a second fluid line fluidly connected to the master cylinder. The first fluid line is connected substantially tangentially to the circumferential wall of the substantially circular flow chamber whereby a pressure wave in the fluid entering the substantially circular flow chamber from the first fluid line will be forced to move in a substantially circular path to thereby dissipate the pressure wave.

Yet another aspect of the present invention is to provide a fluid system adapted to be connected to a braking system of a vehicle for dissipating a pressure wave in a fluid coming from the braking system. The fluid system includes a substantially circular flow chamber, a first fluid line and a second fluid line. The substantially circular flow chamber has a circumferential wall, with the substantially circular flow chamber being adapted to contain the fluid. The first fluid line is connected to the substantially circular flow chamber. The first fluid line is adapted to allow the pressure wave in the fluid to enter into the substantially circular flow chamber. The second fluid line is also connected to the substantially circular flow chamber. The second fluid line is adapted to be fluidly connected to a master cylinder of the braking system. The first fluid line is connected substantially tangentially to the circumferential wall of the substantially circular flow chamber whereby the pressure wave entering the substantially circular flow chamber from the first fluid line will be forced to move in a substantially circular path to thereby dissipate the pressure wave.

The fluid system and the brake system of the vehicle are efficient in use, economical to install, capable of a long operable life, and particularly adapted for the proposed use.

These and other features, advantages, and objects of the present invention will be further understood and appreciated by those skilled in the art by reference to the following specification, claims and appended drawings.

BRIEF DESCRIPTION OF DRAWINGS

FIG. 2 is a cross-sectional view of a disc brake of the present invention;

FIG. 3 is a cross-sectional view of the disc brake of the present invention taken along line III—III of FIG. 2;

FIG. 8 is a cross-sectional view of a prior art brake housing and a flow chamber of the present invention; and FIG. 9 is a cross-sectional view of the flow chamber housing of the present invention taken along line IX—IX of FIG. 8.

DETAILED DESCRIPTION

For purposes of description herein, the terms "upper," "lower," "right" "left," "rear," "front," "vertical," "horizontal," and derivatives thereof shall relate to the invention as orientated in FIG. 2. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
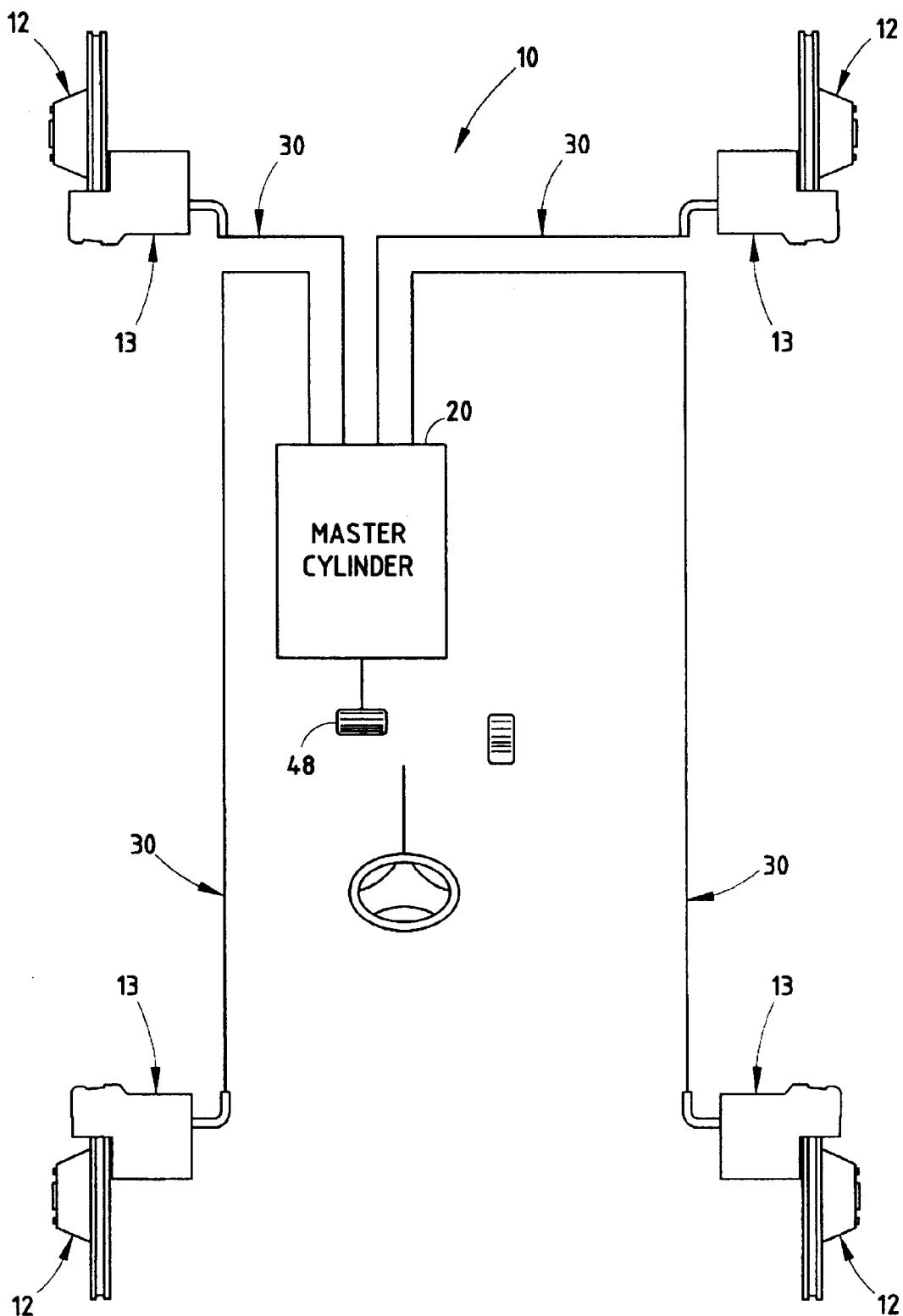
FIG. 1 is a block diagram illustrating a vehicle embodying a braking system according to the present invention.
Figure 4:
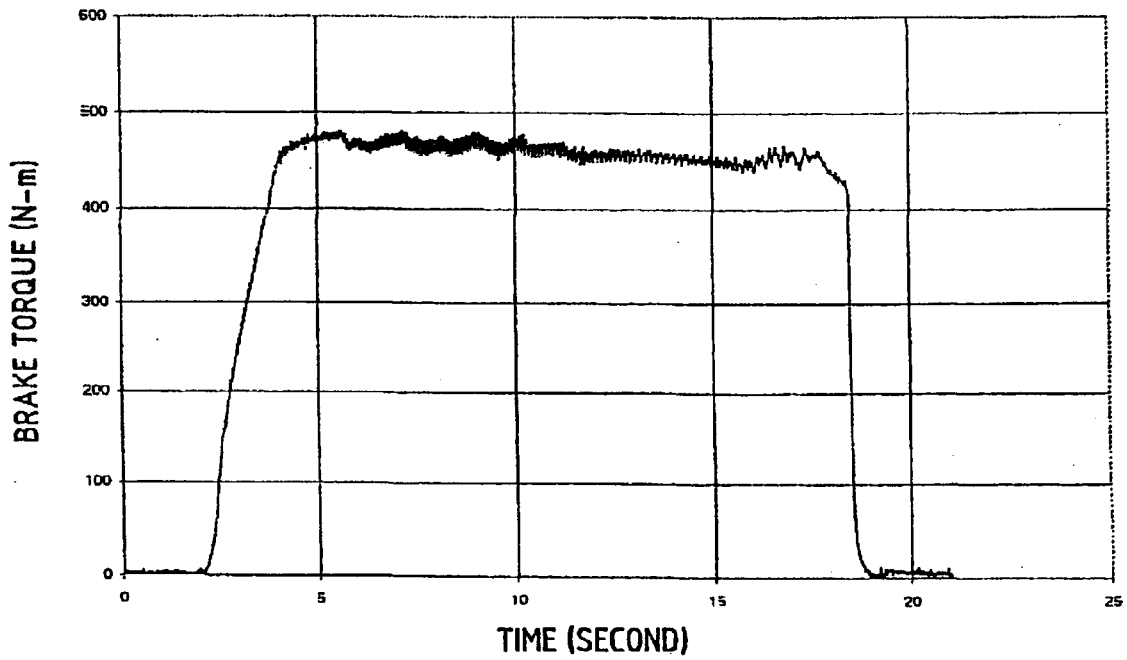
FIG. 4 is a graph showing the brake torque of a vehicle using a rotor with a DTV less than 6 microns as a function of time during a simulated stop on a brake dynamometer.
Figure 5:
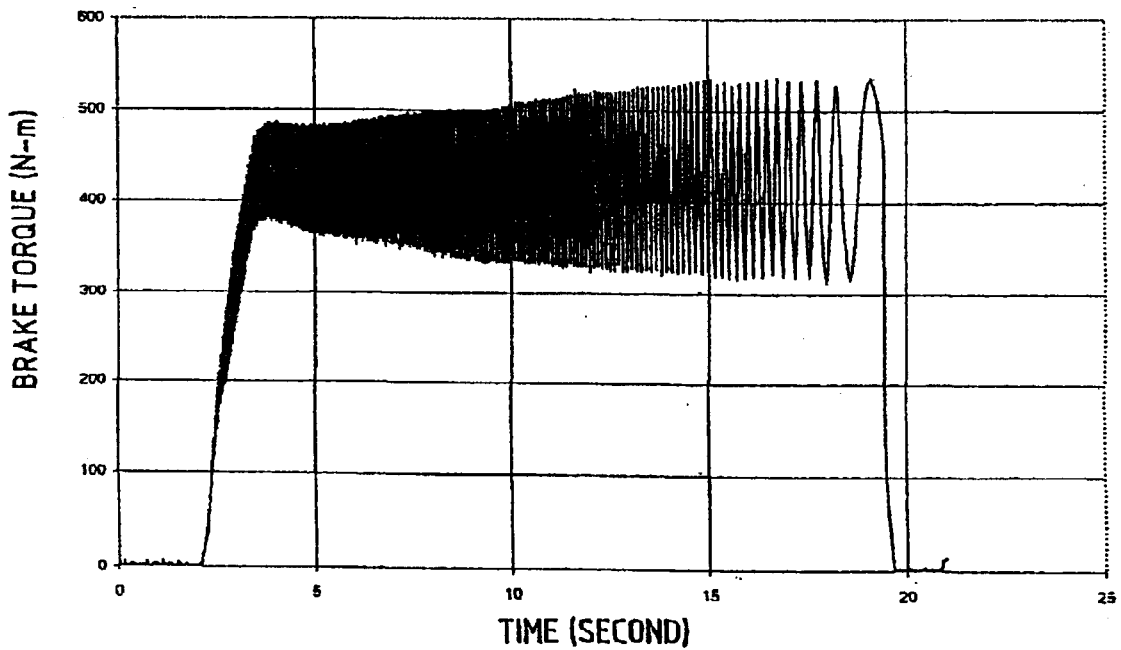
FIG. 5 is a graph showing the brake torque of a vehicle using a rotor with a DTV of 30 microns as a function of time during a simulated stop on a brake dynamometer.

Referring to FIG. 1, reference number 10 generally designates a vehicle embodying the present invention. The vehicle 10 includes wheels 12, a brake housing 14 and a flow chamber housing 58 combined within a single combination housing 13. The brake housing 14 (FIG. 2) includes a friction element 22 being adapted to move to engage a portion of the wheels 12 to inhibit rotation of the wheels 12. The flow chamber housing 58 (FIG. 2) includes a substantially circular flow chamber 18 and a first fluid line 28. The substantially circular flow chamber 18 has a circumferentialwall 26 an enlarged flow chamber 18 having a peripheral wall 26 and a pair of oppositely facing walls 48. The enlarged flow chamber 18 is fluidly interconnected to the brake housing 14 for supplying fluid to the brake housing 14 for moving the friction element 22. The flow chamber housing 58 includes a first fluid line 28 is connected substantially tangentially to connected to the peripheral wall 26 of the enlarged flow chamber 18 and a second fluid line 30 connected to one of the pair of oppositely facing walls 48 of the enlarged flow chamber 18. A pressure wave in the fluid entering the substantially circularenlarged flow chamber 18 from the first fluid line 28 will be forced to move in asubstantially circular pathreflect off of the peripheral wall 26 at a plurality of points to thereby dissipate the pressure wave. The flow chamber housing 58 also preferably includes a second fluid line 30 is also fluidly connected to a master cylinder 20 of the vehicle 10 (FIG. 1).

The brake housing 14 of the present invention can be either a disc brake system (FIGS. 2 and 3) or a drum brake system (not shown). In the illustrated example, each wheel 12 of the vehicle 10 is associated with one brake housing 14 of a disc brake system. The brake housing 14 (FIGS. 2 and 3) includes a caliper 32, a piston 34 and a brake fluid line 36. The wheel 12 includes a rotor 38, a hub 39 and a tire (not shown) adapted to be connected to the hub 39. The caliper 32 straddles the rotor 38 of the wheel 12 and includes a bore 40 facing the rotor 38. The piston 34 is located in the bore 40 and also faces the rotor 38. The brake fluid line 36 is fluidly connected to the bore 40 at a position behind the piston 34 and supplies a fluid to the bore 40 to force the piston 34 out of the bore 40 towards the rotor 38. The friction element 22 is a brake pad attached to an end of the piston 34 facing the rotor 38 and therefore is configured for engagement with the rotor 38. The brake housing illustrated in FIGS. 2 and 3 is a floating-caliper disc brake system. Therefore, a static brake pad 42 is connected to an arm 44 of the caliper 32 opposite the brake pad 22 and the piston 34. When the brake pad 22 on the piston 34 abuts the rotor 38, the caliper 32 will be forced to the right as seen in FIG. 2 such that the static brake pad 42 will abut a face of the rotor 38 opposite the brake pad 22. The disc brake system could also be a fixed-caliper disc brake system having a second piston and brake pad 22 instead of the static brake pad 42. The floating-caliper disc brake system and the caliper disc brake system as described directly above are known to those skilled in the art. Alternatively, the brake housing 14 could include brake shoes adapted to engage the inside surface of a brake drum of a drum brake system. In the drum brake system, pistons fluidly connected to a brake fluid line force the brake shoes outwardly into contact with the inside surface of the drum. Drum brake systems are known to those skilled in the art.

In the illustrated example, a brake pedal 46 in the vehicle 10 is depressed by the driver of the vehicle 10 to decelerate the vehicle 10. When the brake pedal 46 is depressed, the master cylinder 20 will force fluid in the brake fluid lines 36 to move into the bore 40 of the caliper 32 of the brake housing 14 as discussed directly above to move the piston 34 and brake pad 22. When the rotor 38 of the wheel 12 has a variation in thickness at a point where the brake pad 22 engages the rotor 38, the thicker portions of the rotor 38 will push the brake pad 22 and piston 34 towards the back of the bore 40 in the caliper 32. The piston 34 being forced into the bore 40 will generate a rise in pressure in the brake fluid. Alternatively, in a drum brake system, insufficient cylindricity of the drum will cause pistons to generate a rise in pressure in the brake fluid. The rise in pressure in the brake fluid sends a pressure wave out of the brake fluid line 36 of the brake housing 14. Furthermore, the brake system will experience brake torque variation in connection with the movement of the piston 34 and brake pad 22 in correlation to the thickness variation of the rotor 38. Consequently, the brake fluid will experience a rise in pressure corresponding to the brake torque variation.

The substantially circular flow chamber 18 dissipates the pressure wave coming out of the brake housing 14 to reduce brake torque variation. In a preferred embodiment, the circularenlarged flow chamber 18 dissipates the pressure wave coming out of the brake housing 14 to reduce the brake torque variation. The enlarged flow chamber 18 and the brake housing 14 are preferably combined in a single device (the combination housing 13). As explained in more detail below, the circularenlarged flow chamber 18 could also be located within a flow chamber housing 58 configured to be connected to prior art brake housings. The circular flow chamber 18 is disc shaped with a pair of oppositely facing walls 48, with the circumferential wall 26 being located between the walls 48. In the combination housing 13, the first fluid line 28 is fluidly connected to the bore 40 of the caliper 32 of the brake housing 14 through the brake fluid line 36. Furthermore, the second fluid line 30 is fluidly connected to the master cylinder 20. Therefore, the master cylinder 20 is fluidly connected to each bore 40 of the brake housings 14. The first fluid line 28 is any fluid path between the circularenlarged flow chamber 18 and the brake housing 14. Likewise, the second fluid line 30 is any fluid path between the circularenlarged flow chamber 18 and the master cylinder 20. The master cylinder 20 forces brake fluid through the second fluid line 30, into the circularenlarged flow chamber 18, out the first fluid line 28 and into the bore 40 to engage the friction element 22 with the rotor 38 of the wheel 12.

The illustrated enlarged flow chamber 18 dissipates the pressure wave coming out of the brake housing 14 to reduce brake torque variation by reflecting the pressure wall off of the peripheral wall at a plurality of points to thereby dissipate the pressure wave through interference of a portion of the pressure wave with other portions of the pressure wave. In a preferred embodiment, the peripheral wall 26 of the enlarged flow chamber 18 is a substantially circular wall. Therefore, the enlarged flow chamber 18 would be a substantially circular flow chamber. Furthermore, the first fluid line 28 is connected substantially tangentially to the peripheral wall 26 of the substantially circular flow chamber 18. Substantially tangentially is defined as a connection whereby a fluid in the first fluid line 28 will enter the enlarged flow chamber 18 along a path Inwherein the fluid will be parallel to a portion of the enlarged flow chamber 18 adjacent the opening of the first fluid line 28 into the enlarged flow chamber 18. In the preferred embodiment, the pressure wave in the brake fluid will leave the bore 40 of the brake housing 14 and enter the circularenlarged flow chamber 18 through the first fluid line 28. When the first fluid line 28 is connected substantially tangentially to the circumferential wall 26 of the circular flow chamber, peripheralthe pressure wave in the brake fluid will be forced to move in a circular path as the pressure wave contacts the wall 26 of the enlarged flow chamber 18 having the substantially circular circumferential wall 26. Substantially tangentially is defined as a connection whereby a fluid in the first fluid line 28 will enter the circular flow chamber 18 along a path wherein the fluid will be parallel to a portion of the circular flow chamber 18 adjacent the opening of the first fluid line 28 into the wall, the pressure wave in the brake fluid will be forced to move in a circular path as the pressure wave contacts the circular flow chamber 18. Accordingly, the circumferential wall 26 is preferably circular.peripheral wall 26. It is contemplated, however, that the circumferential peripheral wall 26 could have other geometric configurations that would cause the pressure wave to move in a circular path.reflect and dissipate. For example, substantially circular could include a polygonal circumferential wall could be polygonalwall with many sides such that the pressure wave would move in a substantially circular path. As the pressure wave moves in along the circular path, the pressure wave will dissipate. It is further contemplated that the peripheral wall 26 could have other geometric shapes wherein the pressure wave would reflect off of the peripheral wall 26 to dissipate the pressure wave. Additionally, although the walls 48 are shown as being planar, it is contemplated that the walls 48 could be non-planar. Preferably, the second fluid line 30 is not connected to the circular enlarged flow chamber 18 along the circumferentialperipheral wall 26. Therefore, the pressure wave will substantially dissipate before the pressure wave can be transferred out the second fluid line 30. Since the pressure of the brake fluid in the second line 30 will remain approximately constant because of the dissipation of the pressure wave in the substantially circularenlarged flow chamber 18, the pressure wave will not be transferred to the master cylinder 20. Furthermore, the overall pressure of the brake fluid in the bore 40, the brake fluid line 36, the first fluid line 28 and the enlarged fluid chamber 18, combining the nominal pressure of the brake fluid and the total value of the pressure fluctuations (which will be below and above the nominal pressure) in the brake fluid due to the pressure wave, will remain substantially constant. Therefore, in addition to the dissipation of the pressure wave, the enlarged flow chamber circular flow chamber 18 will also reduce brake torque variation.

Figure 6:
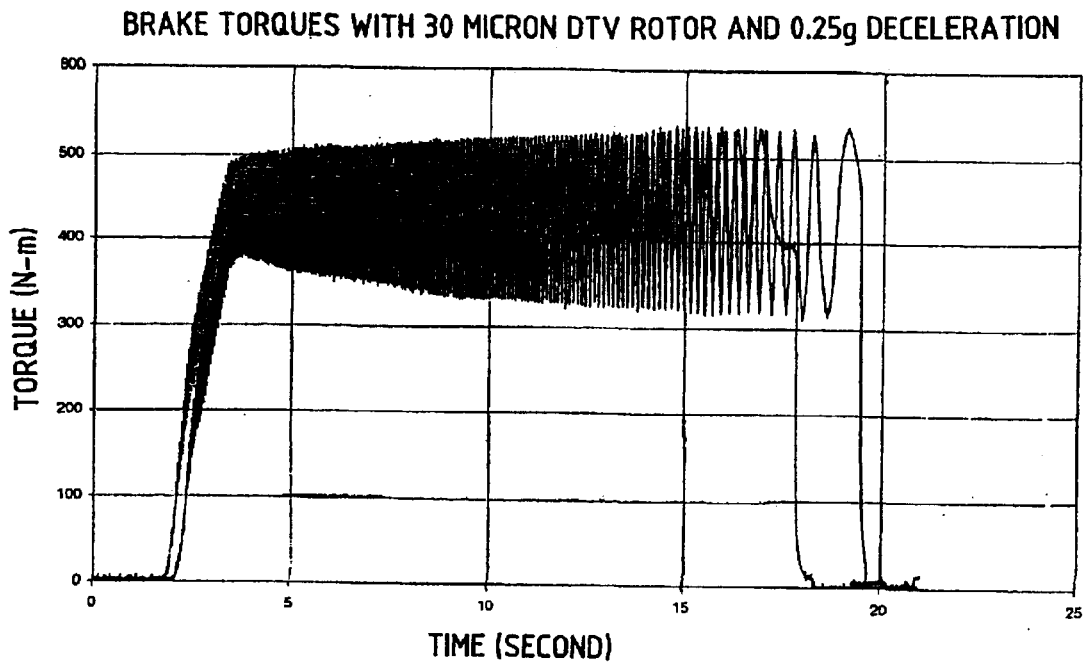
FIG. 6 is a graph showing the brake torque of a vehicle using a rotor having a DTV of 30 microns in a prior art brake housing and a vehicle having a circular flow chamber of the present invention with a rotor having a DTV of 30 microns as a function of time during a simulated stop on a brake dynamometer.
Figure 7:
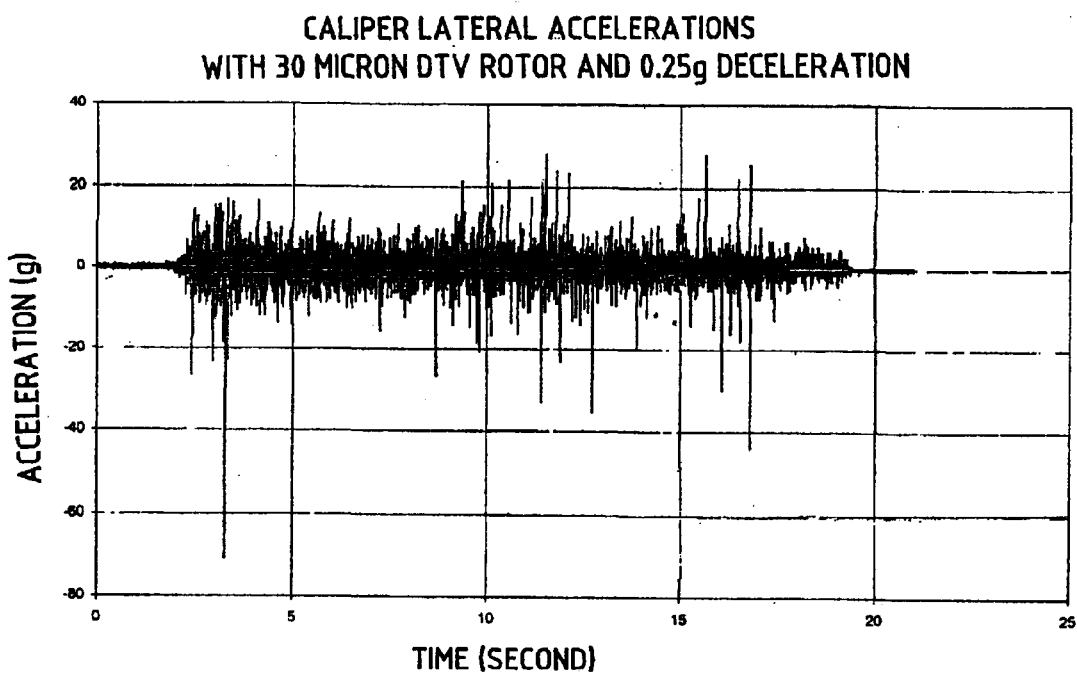
FIG. 7 is a graph showing the lateral acceleration of a caliper of a vehicle of the prior art rotor and the caliper of a vehicle in combination with the circular flow chamber of the present invention, each having a rotor with a DTV of 30 microns, as a function of time during a simulated stop on a brake dynamometer.

FIGS. 6 and 7 illustrate the brake torque and the caliper lateral acceleration, respectively, of a vehicle 10 having that has an enlarged flow chamber 18 that is a circular flow chamber versus a vehicle 10 without FIG. the enlarged flow chamber 18. FIG. 6 is a graph showing the brake torque of a vehicle using a rotor having a DTV of 30 microns in a prior art brake housing and a vehicle 10 having a circular flow chamber 18 of the present invention with a rotor 38 having a DTV of 30 microns as a function of time during a simulated stop on a brake dynamometer. As seen in FIG. 6, the brake torque variation of the vehicle 10 having the circular flow chamber 18 is much less than the brake torque variation of the prior art vehicle. Furthermore, FIG. 7 is a graph showing the lateral acceleration of a caliper of a vehicle of the prior art rotor and the caliper 32 of a vehicle 10 in combination with the circular flow chamber 18 of the present invention, each having a rotor with a DTV of 30 microns, as a function of time during a simulated stop on a brake dynamometer. As seen in FIG. 7, the variation in lateral acceleration of the caliper 32 of the vehicle 10 having the circular flow chamber 18 is much less than the brake torque variation of the prior art vehicle. Consequently, the vehicle 10 using the circular flow chamber 18 will provide a smoother feel and ride for the driver than the prior art vehicle.

In the illustrated example, the first fluid line 28 includes a first conduit 50 connected to brake fluid line 36 of the brake housing 14, a second conduit 52, a third conduit 54, a fourth conduit 56 and a fifth conduit 57. The first conduit 50 is co-linear with the brake fluid line 36. The fifth conduit 57 is connected to the circumferentialperipheral wall 26 and opens into the substantially circularenlarged flow chamber 18. When the enlarged flow chamber 18 is 18, a circular flow chamber, the fifth conduit 57 is connected to the peripheral wall 26 with a line along a periphery of the fifth conduit 57 being substantially tangential to the circumferentialperipheral wall 26. Preferably, the first conduit 50 is transverse to the second conduit 52, the second conduit 52 is transverse to the third conduit 54, the third conduit 54 is transverse to the fourth conduit 56, and the fourth conduit 56 is transverse to the fifth conduit 57. According to wave theory, transverse conduits will dissipate the pressure wave a small amount because some of the pressure wave will reflect backwards before the pressure wave can make a turn into the next conduit, thereby dissipating the pressure wave a little before the pressure wave enters the enlarged flow chamber 18. Furthermore, the first conduit 52 and the third conduit 56 are preferably parallel. Moreover, the second conduit 52 and the fifth conduit 57 are also preferably parallel. Therefore, the circumferential wall 26 can be parallel to the brake fluid line 36 and the circular flow chamber 18 can be located adjacent the brake housing 14 to minimize the space required for the circular flow chamber 18. Moreover, the fifth conduit 57 is preferably connected to the circumferentialperipheral wall 26 at a location substantially equidistant from each of the opposing walls 48. Therefore, the pressure wave in the brake fluid will have a maximum amount of space to be able to dissipate.

The reference numeral 58a (FIGS. 8 and 9) generally designates a second preferred embodiment of the flow chamber housing of the invention. Since the flow chamber housing 58a is similar to the previously described flow chamber housing 58, similar parts appearing in FIGS. 2–3 and FIGS. 8–9, respectively, are represented by the same, corresponding reference numeral, except for the suffix "a" in the numerals of the latter. The flow chamber housing 58a in the second preferred embodiment is configured to be attached to a prior art brake housing 14a for retrofitting prior art vehicles. The brake housing 14a is similar to the brake housing 14 of the first embodiment, except that the brake housing 14a and the flow chamber housing 58a are combined within one device.

In the illustrated example, the prior art brake housing 14a includes an inside threaded port 62 and the flow chamber housing 58a includes an outside threaded fitting 63 extending from the flow chamber housing 14a. The outside threaded fitting 63 is screwed into the inside threaded port 62 to connect the flow chamber housing 58a to the prior art brake housing 14a. The first conduit 50a of the first fluid line 28a is located with the outside threaded fitting 63 and the brake fluid line 36a of the brake housing 14a is connected to the inside threaded port 62 such that the first fluid line 28a is fluidly connected to the brake fluid line 36a when the flow chamber housing 58a is connected to the prior art brake housing 14a.

The illustrated flow chamber housing 58a includes a first portion 64 and a second portion 66. The first portion 64 includes one of the walls 48a of the substantially circularenlarged flow chamber 18a and the second fluid line 30a. The second portion 66 includes the circumferentialperipheral wall 26a, the other of the walls 48a and the first fluid line 28a. The first portion 64 of the flow chamber housing 58a is connected to the second portion 66 of the flow chamber housing 6458a with screws 70. Preferably, the first conduit 50a, the second conduit 52a, the third conduit 54a, the fourth conduit 56a and the fifth conduit 57a of the first fluid line 28a are formed in the first portion 64 of the flow chamber housing 58a by drilling the holes into the peripheryoutside surface of the first portion 64. The holes are then blocked with a piece of material 72 placed within the holes adjacent the outside peripherysurface of the first portion 64.

In the forgoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A brake system for a vehicle having wheels, the brake system comprising:
   a brake housing including a friction element being adapted to move to engage a portion of the wheels to inhibit rotation of the wheels; and
   a flow chamber housing including a substantially circular enlarged flow chamber, the substantially circular enlarged flow chamber having a circumferential peripheral wall and a pair of oppositely facing walls, the enlarged flow chamber being fluidly interconnected to the brake housing for supplying fluid to the brake housing for moving the friction element, the flow chamber housing further including a first fluid line connected to the peripheral wall of the enlarged flow chamber and a second fluid line connected to one of the pair of oppositely facing walls of the enlarged flow chamber;
   wherein the brake fluid line is connected substantially tangentially to the circumferential wall of the substantially circular flow chamber whereby a pressure wave in the fluid entering the substantially circularenlarged flow chamber from the first fluid line will be forced to move in a substantially circular path reflect off of the peripheral wall at a plurality of points to thereby dissipate the pressure wave.

2. The brake system of claim 1, wherein:
   the peripheral wall is a substantially circular flow chamber is disc shaped with a pair of oppositely facing walls, the circumferential wall being located between the walls, and the first fluid line is connected substantially tangentially to the substantially circular wall.

3. The brake system of claim 2, wherein:
   the first fluid line includes a conduit, with a line along a periphery of the conduit being substantially tangential to the substantially circular wall.

4. The brake system of claim 3, wherein:
   the conduit is connected to the circumferential wall at a location substantially equidistant from each of the oppositely facing walls.

5. The brake system of claim 1, wherein:
   the brake housing includes an inside threaded port;
   the flow chamber housing includes an outside threaded fitting extending from the flow chamber housing; and
   the outside threaded fitting is adapted to be screwed into the inside threaded port of the brake housing for connecting the flow chamber housing to the brake housing.

6. The brake system of claim 5 wherein:
   the flow chamber housing has a first portion and a second portion;
   the first portion includes the one of the oppositely facing walls of the enlarged flow chamber and a master cylinder fluid line;
   the second portion includes the circumferential peripheral wall, the other of the oppositely facing walls and the first fluid line; and
   the first portion of the flow chamber housing is connected to the second portion of the flow chamber housing.

7. The brake system of claim 1, wherein:
   the first fluid line includes a plurality of conduits; and
   at least two of the conduits are perpendicular.

8. A vehicle comprising:
   a wheel;
   a brake housing located adjacent the wheel, the brake housing including a friction element being adapted to move to engage a portion the wheel to inhibit rotation of the wheel;
   a master cylinder adapted to provide a force to a brake fluid in the brake housing to move the friction element; and
   a flow chamber housing located in a fluid path between the brake housing and the master cylinder;
   the flow chamber housing including a substantially disc-shaped flow chamber having a circumferential wall, a first fluid line fluidly connected to the brake housing and the substantially disc-shaped flow chamber, and a second fluid line fluidly connected to the master cylinder and the substantially disc-shaped flow chamber;
   wherein the first fluid line is connected substantially tangentially to the circumferential wall of the substantially disc-shaped flow chamber whereby a pressure wave in the fluid entering the substantially disc-shaped flow chamber from the first fluid line will be forced to move in a substantially circular path to thereby dissipate the pressure wave.

9. The vehicle of claim 8, wherein:

the substantially disc-shaped flow chamber includes a pair of oppositely facing walls, the circumferential wall being located between the facing walls; and the second fluid line is connected to a central portion of one of the pair of oppositely facing walls.

10. The vehicle of claim 9, wherein:

the brake housing includes an inside threaded port; and the flow chamber housing includes an outside threaded fitting extending from the flow chamber housing;

the outside threaded fitting being adapted to be screwed into the inside threaded port of the brake housing for connecting the flow chamber housing to the brake housing.

11. The vehicle of claim 10, wherein:

the flow chamber housing has a first portion and a second portion;

the first portion includes the one of the walls of the substantially disc-shaped flow chamber and the second fluid line;

the second portion includes the circumferential wall, the other of the walls arid the first fluid line; and the first portion of the flow chamber housing is connected to the second portion of the flow chamber housing.

12. The vehicle of claim 9, wherein:

the first fluid line includes a first conduit, a second conduit, a third conduit, a fourth conduit and a fifth conduit;

the first conduit is transverse to the second conduit, the second conduit is transverse to the third conduit, the third conduit is transverse to the fourth conduit, and the fourth conduit is transverse to the fifth conduit; and the fifth conduit is connected to the circumferential wall and opens into the substantially disc-shaped flow chamber.

13. The vehicle of claim 12, wherein:

a line along a periphery of the fifth conduit is substantially tangential to the circumferential wall.

14. The vehicle of claim 12, wherein:

the fifth conduit is connected to the circumferential wall at a location substantially equidistant from each of the oppositely facing walls.

15. A fluid system adapted to be connected to a braking system of a vehicle for dissipating a pressure wave in a fluid coming from the braking system, the fluid system comprising:

a substantially disc-shaped flow chamber having a circumferential wall, the substantially disc-shaped flow chamber being adapted to contain the fluid;

a first fluid line connected to the substantially disc-shaped flow chamber, the first fluid line adapted to allow the pressure wave in the fluid to enter into the substantially disc-shaped flow chamber; and a second fluid line connected to the substantially disc-shaped flow chamber, the second fluid line being adapted to be fluidly connected to a master cylinder of the braking system;

wherein the first fluid line is connected substantially tangentially to the circumferential wall of the substantially disc-shaped flow chamber whereby the pressure wave entering the substantially disc-shaped flow chamber from the first fluid line will be forced to move in a substantially circular path to thereby dissipate the pressure wave.

16. The fluid system of claim 15, wherein:

the substantially disc-shaped flow chamber includes a pair of oppositely facing walls, the circumferential wall being located between the pair of oppositely facing walls; and the second fluid line is connected to a central portion of one of the pair of oppositely facing walls.

17. The fluid system of claim 16, wherein:

the substantially disc-shaped flow chamber, the first fluid line and the second fluid line are located within a flow chamber housing, the flow chamber housing including an outside threaded fitting extending from the flow chamber housing;

the outside threaded fitting being adapted to be screwed into an inside threaded port of the brake system for connecting the flow chamber housing to the brake system.

18. The fluid system of claim 17, wherein:

the flow chamber housing has a first portion and a second portion;

the first portion includes the one of the walls of the substantially disc-shaped flow chamber and the second fluid line;

the second portion includes the circumferential wall, the other of the walls and the first fluid line; and the first portion of the flow chamber housing is connected to the second portion of the flow chamber housing.

19. The fluid system of claim 16, wherein:

the first fluid line includes a first conduit, a second conduit, a third conduit, a fourth conduit and a fifth conduit;

the first conduit is transverse to the second conduit, the second conduit is transverse to the third conduit, the third conduit is transverse to the fourth conduit, and the fourth conduit is transverse to the fifth conduit; and the fifth conduit is connected to the circumferential wall and opens into the substantially disc-shaped flow chamber.

20. The fluid system of claim 19, wherein:

a line along a periphery of the fifth conduit is substantially tangential to the circumferential wall.

* * * * *